(12) United States Patent
Laserson et al.

(10) Patent No.: US 11,922,478 B2
(45) Date of Patent: Mar. 5, 2024

(54) ALTERNATIVE ITEM BOOSTER SERVICE

(71) Applicant: NCR Voyix Corporation, Atlanta, GA (US)

(72) Inventors: Itamar David Laserson, Givat Shmuel (IL); Rotem Chudin, Kfar-Saba (IL); Julie Dvora Katz Ohayon, Ashdod (IL); Moshe Shaharur, Tel-Aviv (IL)

(73) Assignee: NCR Voyix Corporation, Atlanta, GA (US)

( * ) Notice: Subject to any disclaimer, the term of this patent is extended or adjusted under 35 U.S.C. 154(b) by 251 days.

(21) Appl. No.: 17/084,794

(22) Filed: Oct. 30, 2020

(65) Prior Publication Data

US 2022/0138830 A1   May 5, 2022

(51) Int. Cl.
```
G06Q 30/00       (2023.01)
G06N 20/00       (2019.01)
G06Q 10/0637     (2023.01)
G06Q 30/0201     (2023.01)
G06Q 30/0601     (2023.01)
```

(52) U.S. Cl.
CPC ......... *G06Q 30/0631* (2013.01); *G06N 20/00* (2019.01); *G06Q 10/0637* (2013.01); *G06Q 30/0201* (2013.01); *G06Q 30/0629* (2013.01); *G06Q 30/0635* (2013.01)

(58) Field of Classification Search
None
See application file for complete search history.

(56) References Cited

U.S. PATENT DOCUMENTS

| | | | | |
|---|---|---|---|---|
| 7,974,888 | B2* | 7/2011 | Kane, Jr. | G06F 16/958 705/26.7 |
| 10,162,868 | B1* | 12/2018 | Zappella | G06F 16/24578 |
| 10,789,637 | B1* | 9/2020 | Jain | G06Q 30/0631 |
| 2003/0105682 | A1* | 6/2003 | Dicker | G06Q 30/0253 705/26.8 |
| 2015/0127483 | A1* | 5/2015 | Elliot | G06Q 30/0633 705/26.8 |
| 2016/0125500 | A1* | 5/2016 | Wang | G06Q 30/0631 705/26.7 |
| 2017/0364930 | A1* | 12/2017 | Kannan | G06Q 30/0269 |
| 2020/0005379 | A1* | 1/2020 | Bastide | G06Q 30/0633 |
| 2020/0273083 | A1 | 8/2020 | Motwani et al. | |
| 2020/0380583 | A1* | 12/2020 | Lee | G06Q 30/0631 |
| 2021/0374825 | A1* | 12/2021 | Periyathambi | G06Q 30/0631 |

FOREIGN PATENT DOCUMENTS

WO   2005/086059 A1   9/2005

OTHER PUBLICATIONS

EP Search Report.

* cited by examiner

*Primary Examiner* — Mila Airapetian
(74) *Attorney, Agent, or Firm* — Schwegman Lundberg & Woessner, P.A.

(57) ABSTRACT

Item vectors representing transaction contexts for items are mapped to multidimensional space. A request is received for an alternative to a given item from a resource. The multidimensional space is evaluated to identify closest candidate items to the given item based on the corresponding item vectors. An optimal candidate item is selected from the candidate items based on the request. The association between the given item and the optimal candidate item is injected within a process workflow associated with the resource.

11 Claims, 4 Drawing Sheets

ALTERNATIVE ITEM BOOSTER SERVICE

BACKGROUND

Maintaining a successful Private label is essential for retailers to increase their profit, create more loyalty customers and increase the store variety. But Retailers currently do not have automated tools and services to promote their private labels, so they often have to rely on manual efforts to drive private label sales.

In fact, retailers in the industry are struggling to achieve private label sales since this requires a lot of effort spent by different departments, including marketing, merchandising, campaign, finance, etc. When dealing with private label brands, retailers need to ask themselves: 1) how can private label items be promoted efficiently; 2) how can private label items be suggested as alternatives to natural branded items; and 3) who are the direct competitors for each private label item?

More and more retailers understand the importance of their private label—a global study showed that 65% of the shoppers consider private labels to be a good alternative to named brands. For millennials and generation Z, the results are much higher. Therefore, retailers that fail to adopt an effective strategy to promote and maintain their private label will not be able to sustain the competition (especially in the evolving grocery market).

Margins are low for retailers when selling national branded items, but private label items have significantly higher margins. So, if retailers can increase sales on private label items, the retailers can be more profitable and more competitive.

SUMMARY

In various embodiments, methods and a system for alternative item booster service are presented.

According to an aspect, a method for alternative item booster service is presented. For example, a given item code associated with a basket of a current online transaction is received and similarity values for potential alternative item codes to the given item code are obtained. A select alternative item code is selected from the potential alternative item codes and the select alternative item code is provided to a transaction service associated with the current online transaction for recommending as an alternative to the given item code within the basket.

DETAILED DESCRIPTION

Figure 1A:
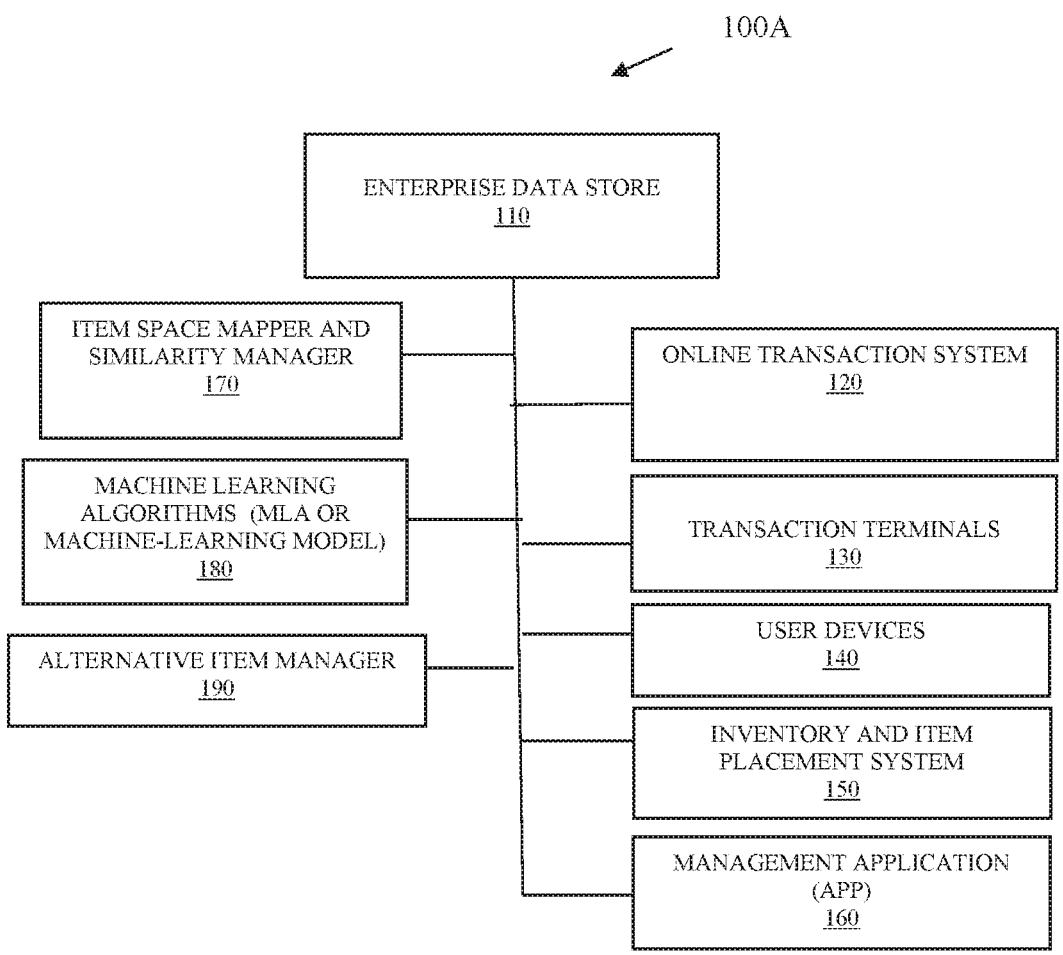
FIG. 1A is a diagram of a system for an alternative item booster service, according to an example embodiment.

FIG. 1A is a diagram of a system 100A for an alternative item booster service, according to an example embodiment. It is to be noted that the components are shown schematically in greatly simplified form, with only those components relevant to understanding of the embodiments being illustrated.

Furthermore, the various components (that are identified in the FIGS. 1A and 1B) are illustrated and the arrangement of the components is presented for purposes of illustration only. It is to be noted that other arrangements with more or less components are possible without departing from the teachings of an alternative item booster service presented herein and below.

The system 100A provides a mechanism by which items associated with private labeled products of a retailer can be enhanced through boosting visibility and recommendations of the private labeled products. The booster services provide automatic mechanisms that do not rely on human intuition and manual effort. The booster services are based on real observations from past recorded transactions rather than presumptions. The booster services are integrated within existing systems of the retailer, such as upselling services associated with promotions, coupons, e-commerce, retailer product layout systems, mobile shopping applications, and others. A "Word2Vec" algorithm is used to determine transaction contexts of items and item vectors are generated, which represent the transaction contexts, Transactions in a transaction history are evaluated, each transaction representing a sentence and each transaction comprising words represented by item codes for items. The transaction context for each item code is processed by the Word2Vec algorithm to generate a corresponding item for the multidimensional space. The item vectors are plotted in the multidimensional space and similarities between items determined based on the distances between plotted item vectors within the multidimensional space. A private label item can be determined to be an alternative item to a natural branded item based on the distance between a plotted natural branded item vector within the multidimensional space and a private label item vector. The alternative private label item can then be identified and used as a recommended replacement or alternative item for a given branded item to consumers and retail staff through integration with the existing retail services, existing retail applications, and existing retail systems.

System 100A comprises an enterprise data store 110, an online transaction system 120, in-store transaction terminals 130, user devices 140, an inventory and item placement system 150, a management application (app) 160, an item space mapper and similarity manager 170, one or more machine-learning algorithms (MLA) 180, and an alternative item manager 190. System 100A comprises a variety of computing devices, each of which comprises at least one processor and a non-transitory computer-readable storage medium comprising executable instructions. The executable instructions when executed by the corresponding processor from the corresponding non-transitory computer-readable storage medium causes that processor to perform operations discussed herein and below with respect to the components 110-190.

An "item code" represents an item from a given retailer's product catalogue. Each item code's affinity/similarity to the other item codes defines that item's vector in multidimensional space. The affinity/similarity and item code vector determined by Word2Vec algorithms based on analysis of the retailer's transaction histories and product catalogue. An "item vector" is a mathematical expression showing points within the multidimensional space representing the contexts of a given item.

Enterprise data store 110 includes a variety of enterprise data, such as transaction histories for transactions performed with a retailer. Other types of data may be included in enterprise data store 100 as well, such as incentives available to consumers, customer data for known customers (loyalty data, profile data, etc.), the transaction details for transactions of customers (including item codes for items), item or product catalogue data, and other information captured and retained by the enterprise for the store and other stores associated with the enterprise (retailer).

Online transaction system 120 comprises interfaces and corresponding software by which customers perform online transactions with a retailer, such as via browsing items, storing selected items in a virtual cart, and checking out (paying for) items in the virtual cart. The online transaction system 120 can be web-based and/or mobile app-based. Virtual cart data provided in real time from online transaction system 120 to enterprise data store 110 or provided via an Application Programming Interface (API) in real time to alternative item manager 190 during an online shopping session when a selected item for the virtual card is out-of-stock.

Transaction terminals 130 comprise peripheral devices (scanners, printers, media acceptors/dispensers, weigh scales, Personal Identification Number (PIN) pads, card readers, etc.) and corresponding software for performing customer checkouts associated with transactions. Real-time item and transaction data provided by terminals to enterprise data store 110.

User devices 140 comprise peripherals (touchscreens, cameras, etc.) and corresponding software for performing customer transactions using a web browser or a mobile application (app). Real time transaction data provided by any app to enterprise data store 110.

Inventory and item placement system 150 comprises devices and corresponding software and user interfaces for performing inventory management and store layout and item placement (planograms). Any item code for an item being processed by system 150 can be sent, via an API, to alternative item manager 190 for an alternative item, such as a private label item code.

Item space mapper and similarity manager 170 initially generates vectors for item codes in a product catalogue (obtained from enterprise data store 110) using transaction histories (again, obtained from enterprise data store 110). In this manner, the item codes in the product catalogue are assigned vectors that map to multidimensional space. Each vector linked to the item codes of the product catalogue. "Item embedding" is applied using a "Word2Vec" algorithm. Word2Vec is a group of algorithms used primarily in the field of Natural Language Processing (NLP) for machine translation. The Word2Vec takes as its input a large corpus of text (product catalogue of item codes and transaction histories from enterprise data store 110) and produces a vector space of typically several hundred dimensions (multidimensional space), each unique word (item code) in the corpus being assigned a corresponding unique vector plotted in the multidimensional space. In this way, item codes that share common contexts within the transaction histories are plotted in close proximity to one another within the multidimensional space. The transaction histories are provided as sentences to the Word2Vec algorithm and the words are the item codes (all words available are identified from the product catalogue). Mathematical calculations can be applied on the vectoral numeric representations (vectors) for the item codes.

Once the product catalogue and transaction histories are processed to create the item code vectors for the items, item space mapper and similarity manager 170 can be provided a given item code (as input or as a request for a suggested item replacement code), the given item code representing a national branded item obtained from any of components 120-160. The output produced by the Word2Vec algorithm is one or more alternative items (private label items) along with similarity scores (which correspond to the distances within the multidimensional space between the position of item code that is the national branded item and the positions of private label items). Item space mapper and similarity manager 170 can determine the specific suggested alternative item codes to provide alternative item manager 190 based on a preset threshold value or range of values and/or based on a predefined number of top similarity scores (preconfigured number of the highest similarity scores from a sorted list of similarity scores).

Item space mapper and similarity manager 170 provides the produced alternative item codes for the national branded item code along with the similarity scores to alternative item manager 190. Alternative item manager 190 provides the alternative item code most likely to be purchased back to the original requester (components 120-160). Components 120-160 provide final transaction feedback, which is derivable/detectable from the transaction details of a given transaction that received an alternative item code from enterprise data store 110 by alternative item manager 190 based on whether or not the alternative item (private label item) was purchased or not purchased for the given transaction.

As system 100A is deployed, feedback is monitored for the actual transactions that were provided alternative private label item codes for given national branded item codes. The feedback is an indication as to whether the alternative private label item code was or was not purchased by a customer for a given transaction. A purchase is positive feedback whereas a non-purchase is negative feedback.

One or more MLAs 180 are trained on input comprising national branded item codes, private label item codes, similarity scores (provided by item space mapper and similarity manager 170 for any given national branded item code), and, optionally, a customer vector for the customer associated with the training transaction. The trained MLAs 180 represented a machine-learning model used for a specific application based on item affinities. Thus, as used herein MLA 180 may also be referred to as a machine-learning model.

In a similar manner to what was discussed above, a customer's transaction history can be provided as sentences to another Word2Vec algorithm and all produced vectors aggregated into a single customer vector representing the transaction history and preferences of the specific customer, which can be plotted in the multidimensional space along with the item vectors for identifying a specific customers relationship to item vectors within the multidimensional space. The customer vectors produced by item space mapper and similarity manager 170.

The trained result to which the MLAs 180 configure to achieve based on the provided input parameters is a selection of a specific alternative private label item code where the feedback indicates a given customer actually purchased for a given transaction.

Once the MLAs 180 are trained, alternative item manager 190 receives in real-time a national branded item code for a given transaction. Item space mapper and similarity manager 170 returns alternative private label item codes and corresponding similarity scores between the national branded item codes to alternative item manager 190. Alternative item manager 190 provides a customer vector for the customer associated with the given transaction, the national branded item code, the alternative private label item codes, and the similarity scores as input to MLA 180 and receives as output a specific private label item code that is most likely to produce a purchase for the transaction by the specific customer. After the transaction, the feedback is received as an indication for whether the specific suggested alternative private label item was or was not purchased by the specific customer of the transaction.

The MLAs 180 are continually retrained, and the item code vectors along with the item codes updated at configured intervals using updated product catalogues, new transaction data, and the feedback. This ensures that alternative private label items for specific national branded items are tailored to a given store's product catalogue and a specific customer. In this way, the accuracy and success of suggested substitute/replacement items is continuously improving and learning.

Components 170-190 may be provided as a web-based and/or cloud-based service to retailers wherein an API to the service is provided to access each retailer's enterprise data store 110 and to communicate alternative private label item codes during transactions. The API permits a management app 160 for use by managers/retail staff to obtain alternative private label items for national branded items on shelves of the retailer to ensure that the shelves are stocked with the alternative private label items most likely to generate sales revenue for the given retailer based on that retailer's transaction data, that retailer's customer base, and that retailer's specific product catalogue.

User-operated devices 140 can be any consumer-operated device, such as wearable processing devices, voice-enabled network appliances (Internet-of-Things (IoTs) devices), laptops, desktops, tablets, network-based vehicle-integrated devices, and others. Devices 140 can also be operated by retail staff associated with inventory and item placement system 150. Devices 140 utilize retailer-provided interfaces (web-based and/or app-based interfaces) to perform shopping and transaction basket checkouts with transaction services of network servers 120.

Transaction terminals 120 can be Point-Of-Sale (POS) terminals, Self-Service Terminals (SSTs), staff-operated mobile devices, and/or kiosks.

System 100A can be integrated into the workflow of existing retailer applications, existing retailer services, and existing retailer systems. For example, system 100A may be integrated into a workflow associated with boosting purchases of private label items in customer baskets (checkout items or virtual cart). Here, a real-time suggestion during a transaction is made to the customer to replace certain national branded items present in the customer's basket with alternative private label items by offering a better price or a discount for the alternative private label items during checkout or while the customer is shopping online. For example, a customer operates a user device 140 with a retailer shopping application (mobile application or browser-based application) to shop. As the customer adds items to his/her basket or virtual cart, the item codes are reported in real time to alternative item manager 190. Alternative item manager 190 interacts with item space mapper and similarity manager 170 and MLAs 180 and obtains a corresponding alternative private label item most likely to cause the customer to replace the national branded item within the basket for purchase. Alternative item manager 190 provides the alternative private label item code and the basket national branded item code via an API to the retailer application associated with the customer shopping via device 140. Business rules are processed by retailer application upon receipt of the two item codes causing retailer application to make a real-time suggestion to the customer to replace the national branded item with the alternative private label item along with an indication that by doing so the customer can save money and/or can use a discount to obtain the alternative private label item at a reduction in price from its listed price.

As another example, existing product recommendation engines can be integrated with alternative item manager 190 via API calls, such that at least one recommended item can include an alternative private label item. These recommendation engines can be biased or weighted to favor alternative private label items. For example, suppose a customer adds Barilla® pasta and olive oil to their basket. The recommendation service may typically recommend different brands of tomato sauces to be added next by the customer. Alternative item manager 190 (through interaction with 170 and 180) dynamically pushes through an API an alternative private label brand of the tomato sauce causing the recommendation engine to weight the private label brand higher in the recommendation list to the customer.

In yet another example, system 100A is integrated with inventory and item placement system 150 of a retail store to assist store merchandizers in organizing store shelves by locating the private label items next to other popular national branded items. For example, the merchandizers use a software of system 150 that helps them place products in relevant shelves. When the merchandizer organizes the items on a pasta shelf, system 100A will recommend locating the private label pasta items next to the Barilla® pasta items, which are considered to be the most popular brand of pasta (based on analyzing millions of baskets).

Again, MLAs 180 comprise a learning mechanism. The user's response to the offers of alternative private label items will be recorded and provided as feedback back to alternative item manager 190, which trains the MLAs 180, such that recommendations are fine-tuned over time. If the customer reacted positively to the recommendation, then it will be tagged as positive otherwise it will be tagged as negative.

Figure 1B:
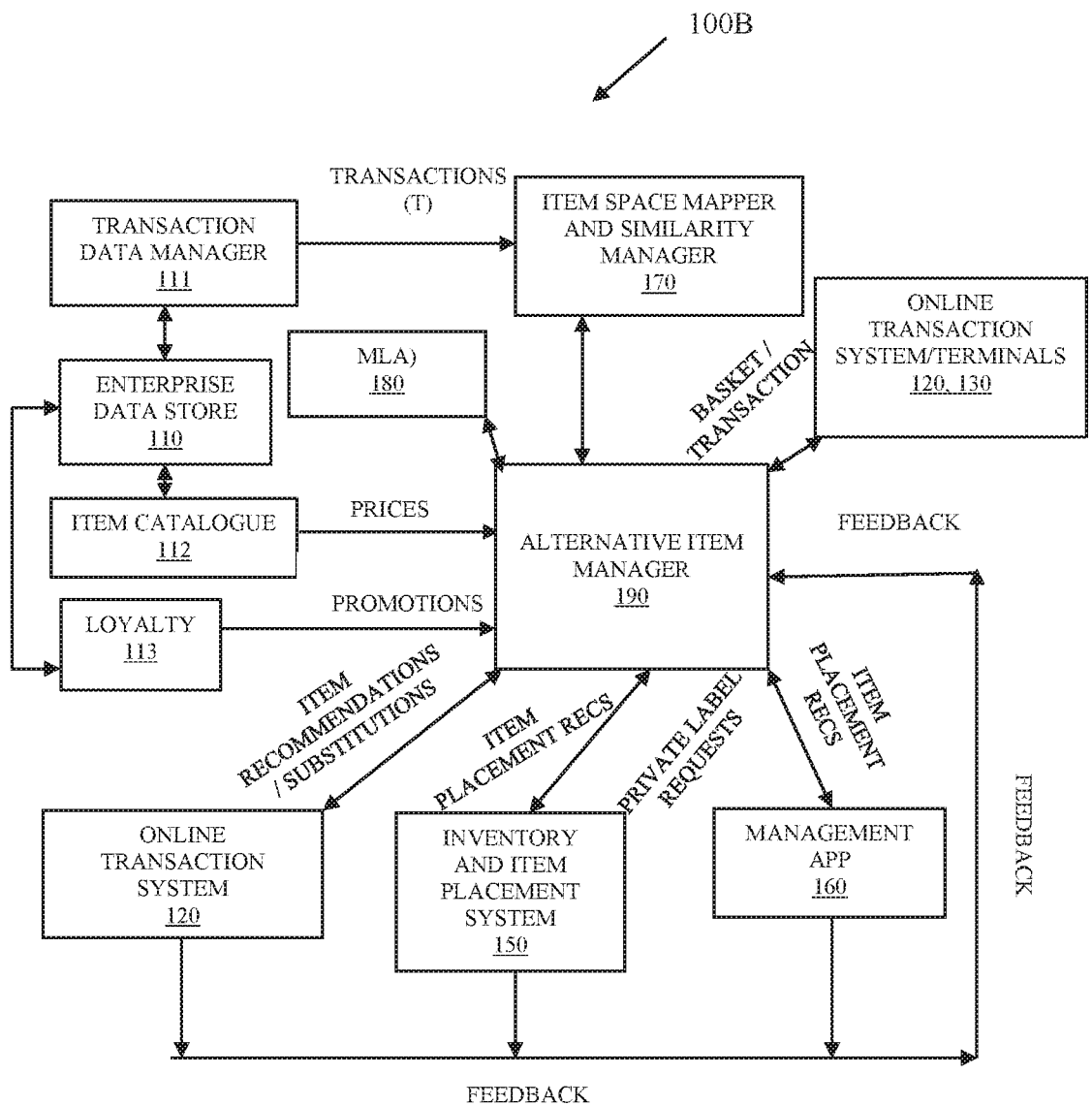
FIG. 1B is a diagram representing a process flow of the system of FIG. 1A, according to an example embodiment.

FIG. 1B is a diagram representing a process flow 100B of the system of FIG. 1A, according to an example embodiment.

FIG. 1B illustrates a more fine-grain view of some components associated with system 100A.

Transaction data manager 111 provides transaction data from enterprise data store to item space mapper and similarity manager 170. Item space mapper and similarity manager 170 generates the multidimensional vector space and unique vectors plotted within that space for each item code of the item catalogue 112.

Alternative item manager 190 trains the MLAs 180 based on item catalogue codes, alternative private label item codes, national branded item codes, similarity values provided by item space mapper and similarity manager 170, and, optionally, customer vectors for customers obtained from loyalty transaction data 113, and feedback obtained for each customer across multiple channels where transaction were conducted or fulfilled for the customer by online transaction system 120, transaction terminals 130, user devices 140, and/or management app 160.

Subsequently, when any given basket/transaction of a customer (via online transaction system 120, transaction terminal 130, or user device 140) or when any given request for an alternative private label item for a given national branded item is received from management app 160 or inventory and item placement system 150, alternative item manager 190 requests item space mapper and similarity manager 170 provide alternative private label item codes and similarity values for the national branded item code based on the vector space and item code vectors. Alternative item manager 190 provides as input to MLA 180, the national branded item code, the alternative private label item codes and corresponding similarity values, and, optionally, a customer vector for the customer. MLA 180 provides as output a selection from the alternative private label item codes that is best tailored for the customer or best tailored for the retailer store (based on the actual transaction data). Alternative item manager 190 uses an API to communicate the selected optimal alternative private label item code tailored for the given situation to the corresponding requester (online transaction system 120, transaction terminal 130, user device 140, inventory and item placement system 150, or management app 160). Results, positive or negative, are fed back to alternative item manager 190 through an API or derived by alternative item manager 190 from final transaction data or sales data associated with the transaction or request. The feedback is used in subsequent training sessions of MLA 180.

System 100A drives online, instore, and mobile shopping to suggest and recommend private label brands for national brands. Recommendations are not simply based on the most-similar private label brands but are based on actual feedback from previous transactions used to train a machine-learning model for accurate customer-specific recommendations that are based on a given customer context. The private label recommendations are integrated into existing retailer applications, existing retailer systems, and existing retailer services.

In an embodiment, components 110-113 and 170-190 are provided as a single cloud-based surface to components 120, 150, and 160 via an API.

These and other embodiments are now discussed with reference to the FIGS. 2-3.

Figure 2:
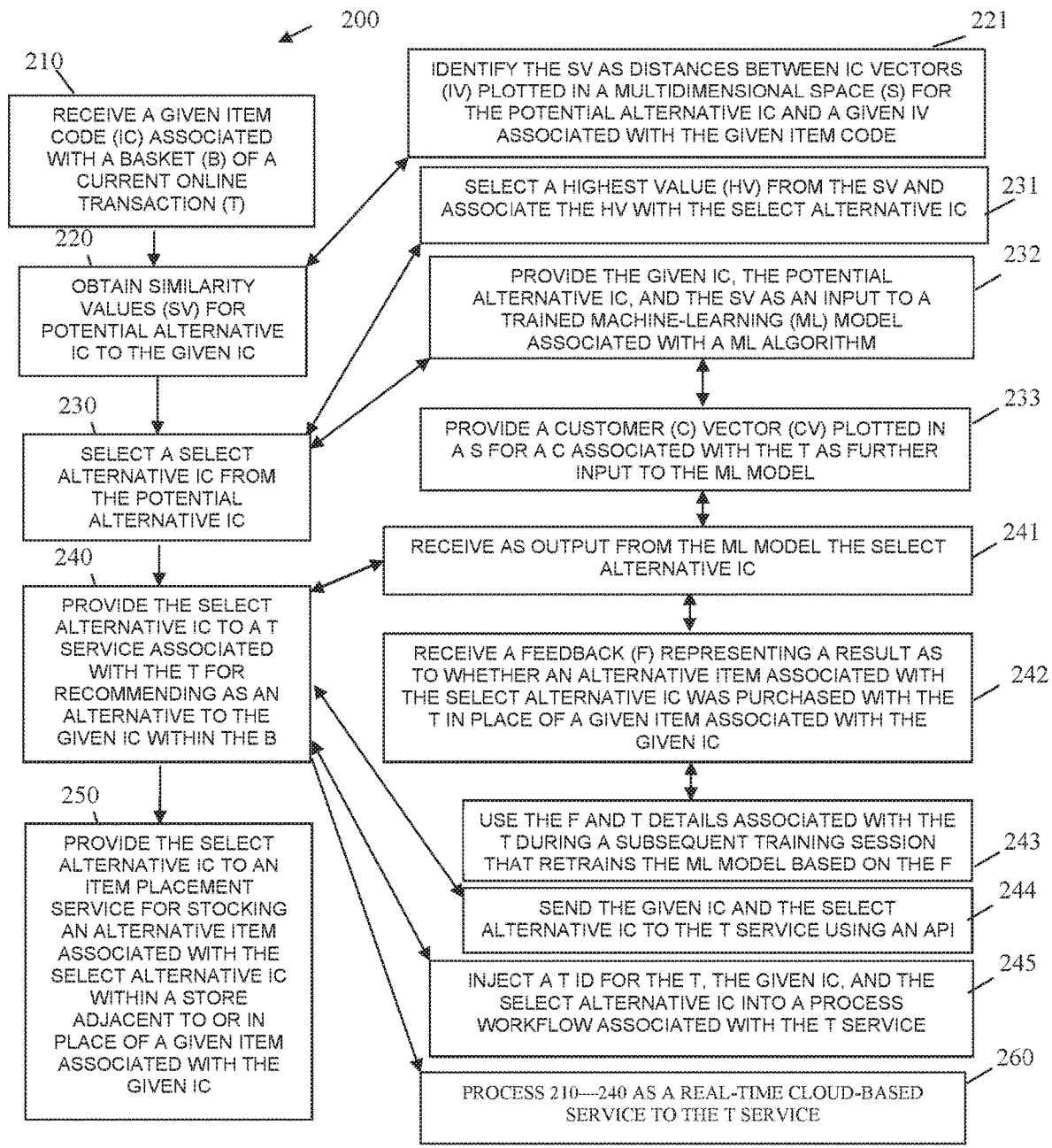
FIG. 2 is a diagram of a method for an alternative item booster service, according to an example embodiment.

FIG. 2 is a diagram of a method 200 for an alternative item booster service, according to an example embodiment. The software module(s) that implements the method 200 is referred to as an "item booster service." The item booster service is implemented as executable instructions programmed and residing within memory and/or a non-transitory computer-readable (processor-readable) storage medium and executed by one or more processors of a device. The processor(s) of the device that executes the item booster service are specifically configured and programmed to process the item booster service. The item booster service has access to one or more network connections during its processing. The network connections can be wired, wireless, or a combination of wired and wireless.

In an embodiment, the device that executes the item booster service is a server. In an embodiment, the server is a cloud processing environment that comprises multiple servers cooperating with one another as a single server. In an embodiment, the server is a Local Area Network (LAN) server.

In an embodiment, the item booster service is all of or some combination of 170-190 and/or the process flow 100B.

In an embodiment, the item booster service performs the processing discussed above with system 100A and process flow 100B.

At 210, the item booster service receives a given item code associated with a basket of a current online transaction between a retailer and a customer of the retailer.

At 220, the item booster service obtains similarity values from potential alternative item codes to the given item code.

In an embodiment, at 221, the item booster service identifies the similarity values as distances between item code vectors plotted in a multidimensional space for the potential alternative item codes and a given item code vector associated with the given item code. This can be done in the manners discussed above with a Word2Vec algorithm that uses transaction histories to generate a transaction context for each item code as an item code vector plotted in the multidimensional space.

At 230, the item booster service selects a select alternative item code to a transaction service associated with the current online transaction for recommending as an alternative to the given item code within the basket of the current online transaction.

In an embodiment, at 231, the item booster service selects a highest value from the similarity values and associated the highest value with the select alternative item code.

In an embodiment, at 232, the item booster service provides the given item code, the potential alternative item codes, and the similarity values as an input to a trained machine-learning model associated with a trained machine-learning algorithm.

In an embodiment of 232 and at 233, the item booster service provides a customer vector plotted in a multidimensional space for a customer associated with the current online transaction as further input to the trained machine-learning model. This can be done by accessing a loyalty data store 113 associated with the customer and obtaining the complete transaction history of the customer, then processing a Word2Vec algorithm to produce a transaction context vector for the customer that is plotted in the multidimensional space. This permits the selection of the select alternative item code to be customer tailored to the customer.

At 240, the item booster service provides the select alternative item code to a transaction service associated with the current online transaction for recommending as an alternative to the given item code within the basket of the current online transaction.

In an embodiment of 233 and 240, at 241, the item booster service receives as output from the trained machine-learning model the select alternative item code.

In an embodiment of 241 and at 242, the item booster service receives a feedback representing a result as to whether an alternative item associated with the alternative item code was purchased or not purchased with the current online transaction in place of a given item associated with the given item code.

In an embodiment of 242 and at 243, the item booster service uses the feedback and transaction details associated with the current online transaction during a subsequent training session that retrains the trained machine-learning model based on the feedback.

In an embodiment, at 244, the item booster service sends the given item code and the select alternative item code to the transaction service using an API.

In an embodiment, at 245, the item booster service injects a transaction identifier for the current online transaction, the given item code, and the select alternative item code into a process workflow associated with the transaction service.

In an embodiment, at 250, the item booster service provides the select alternative item code to an item placement service for stocking an alternative item associated with the select alternative item code within a store adjacent to or in place of a given item associated with the given item code.

In an embodiment, at 260, the item booster service is processed (210-250) as a real-time cloud-based service provided to the transaction service during the current online transaction and during other online transactions processed by the transaction service.

Figure 3:
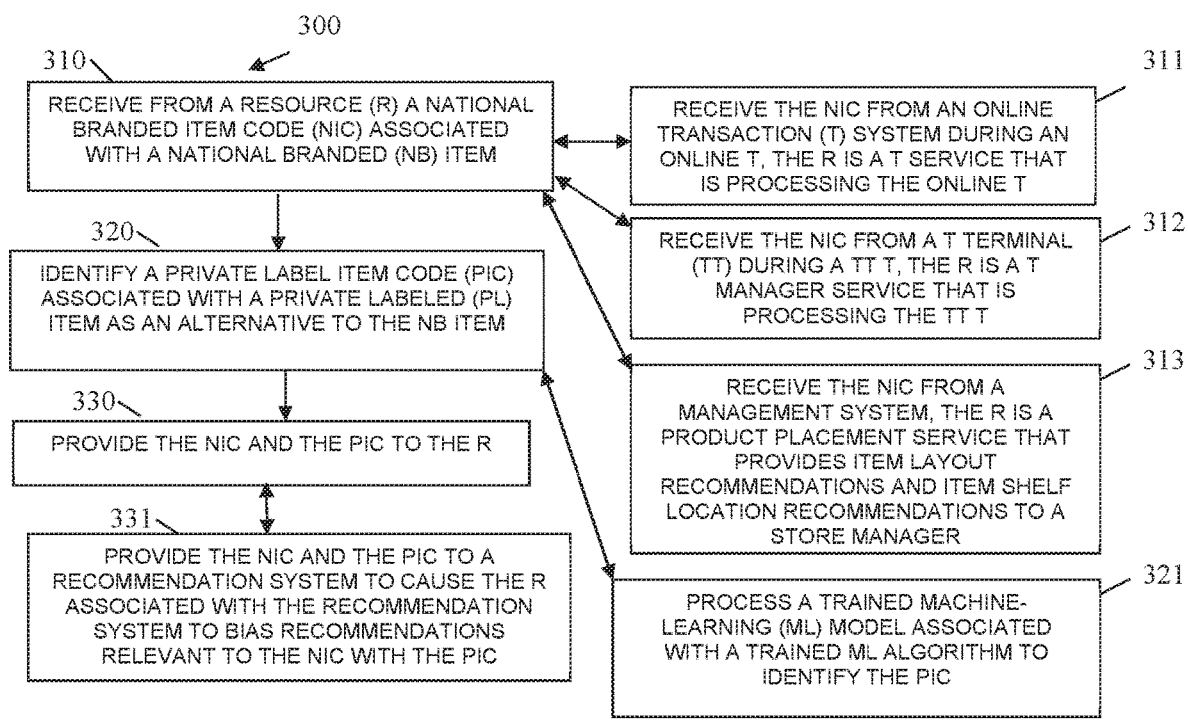
FIG. 3 is a diagram of another method for an alternative item booster service, according to an example embodiment.

FIG. 3 is a diagram of another method 300 for an alternative item booster service, according to an example embodiment. The software module(s) that implements the method 300 is referred to as a "private label booster service." The private label booster service is implemented as executable instructions programmed and residing within memory and/or a non-transitory computer-readable (processor-readable) storage medium and executed by one or more processors of a device. The processors that execute the private label booster service are specifically configured and programmed to process the private label booster service. The private label booster service has access to one or more network connections during its processing. The network connections can be wired, wireless, or a combination of wired and wireless.

In an embodiment, the device that executes the private label booster service is a server. In an embodiment, the server is a cloud processing environment that comprises multiple servers cooperating with one another as a single server. In an embodiment, the server is a LAN server that is local to a retail store.

In an embodiment, the private label booster service is all or some combination of 170-190, process flow 100B, and/or the method 200.

The private label booster service presents another and, in some ways, enhanced processing perspective to that which was described above with the FIG. 2.

At 310, the private label booster service receives from a resource a national branded item code associated with a national branded item.

In an embodiment, at 311, the private label booster service receives the national branded item code from an online transaction system during an online transaction. Here, the resource is a transaction service that is processing the online transaction.

In an embodiment, at 312, the private label booster service receives the national branded item code from a transaction terminal during a transaction-terminal transaction. Here, the resource is a transaction manager that is processing the transaction-terminal transaction.

In an embodiment, at 313, the private label booster service receives the national branded item code from a management system. Here, the resource is a product or item placement service that provides item layout recommendations and item shelf location recommendations to a store manager that operates a user-device 140 and interacts with the placement service.

At 320, the private label booster service identifies a private label item code associated with a private labeled item as an alternative to the national branded item.

In an embodiment, at 321, the private label booster service processes a trained machine-learning model associated with a trained machine-learning algorithm to identify the private label item code.

At 330, the private label booster service provides the national branded item code and the private label item code to the resource.

In an embodiment, at 331, the private label booster service provides the national branded item code and the private label item code to a recommendation system to cause the resource associated with the recommendation system to bias recommendations relevant to the national branded item code with the private label item code.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
receiving, by a processor of a cloud processing environment, a given item code associated with a basket of checkout items of a current online transaction, wherein receiving further includes receiving the given item code and the basket of checkout items from an application programming interface (API) associated with a transaction service that is processing the current online transaction;
obtaining, by the processor, similarity values for potential alternative item codes to the given item code based on item vectors derived from transaction histories for previous transactions of the transaction service, wherein obtaining further includes identifying the similarity values as distances between item code vectors plotted in a multidimensional space for the potential alternative item codes and a given item code vector associated with the given item code;
selecting, by the processor, a select alternative item code from the potential alternative item codes; and
providing, by the processor, a select alternative item code to the transaction service using the API for recommending the select alternative item codes as an alternative to the given item code within the basket of checkout items during the current online transaction.

2. The method of claim 1 further comprising, providing, by the processor, the select alternative item code to an item placement service for stocking an alternative item associated with the select alternative item code within a store adjacent to or in place of a given item associated with the given item code.

3. The method of claim 1 further comprising, processing the method as a real-time cloud-based service to the transaction service.

4. The method of claim 1, wherein selecting further includes selecting a highest value from the similarity values and associating the highest value with the select alternative item code.

5. The method of claim 1, wherein selecting further includes providing the given item code, the potential alternative item codes, and the similarity values as an input to a trained machine-learning model associated with a trained machine-learning algorithm.

6. The method of claim 5, wherein providing the given item code further includes providing a customer vector plotted in the multidimensional space for a customer associated with the current online transaction as a further input to the trained machine-learning model.

7. The method of claim 6, wherein providing the given item code further includes receiving as an output from the trained machine-learning model the select alternative item code.

8. The method of claim 7, wherein providing further includes receiving a feedback representing a result as to whether an alternative item associated with the select alternative item code was purchased with the current online transaction in place of a given item associated with the given item code.

9. The method of claim 8, wherein receiving the feedback further includes using the feedback and transaction details associated with the current online transaction during a subsequent training session that retrains the trained machine-learning model based on the feedback.

10. The method of claim 1, wherein providing further includes sending the given item code and the select alternative item code to the transaction service using the API.

11. The method of claim 1, wherein providing further includes injecting a transaction identifier for the current online transaction, the given item code, and the select alternative item code into a process workflow associated with the transaction service using the API.

* * * * *

UNITED STATES PATENT AND TRADEMARK OFFICE
CERTIFICATE OF CORRECTION

PATENT NO. : 11,922,478 B2
APPLICATION NO. : 17/084794
DATED : March 5, 2024
INVENTOR(S) : Laserson et al.

It is certified that error appears in the above-identified patent and that said Letters Patent is hereby corrected as shown below:

On the Title Page

In item (57), in "Abstract", in Column 2, Line 3, delete "a given" and insert --an-- therefor In item (57), in "Abstract", in Column 2, Line 5, after "the", delete "given"

In item (57), in "Abstract", in Column 2, Line 8, after "the", delete "given"

In the Claims

In Column 10, Line 27, in Claim 1, delete "a given" and insert --an-- therefor

In Column 10, Line 29, in Claim 1, after "the", delete "given"

In Column 10, Line 35, in Claim 1, after "the", delete "given"

In Column 10, Line 41, in Claim 1, delete "a given" and insert --an-- therefor

In Column 10, Line 42, in Claim 1, after "the", delete "given"

In Column 10, Line 43, in Claim 1, delete "a select" and insert --an-- therefor

In Column 10, Line 45, in Claim 1, delete "a select" and insert --the selected-- therefor In Column 10, Line 47, in Claim 1, delete "select" and insert --selected-- therefor In Column 10, Line 48, in Claim 1, after "the", delete "given"

In Column 10, Line 51, in Claim 2, delete "select" and insert --selected-- therefor Signed and Sealed this
Thirteenth Day of August, 2024

Katherine Kelly Vidal
*Director of the United States Patent and Trademark Office*

CERTIFICATE OF CORRECTION (continued)
U.S. Pat. No. 11,922,478 B2

In Column 10, Line 53, in Claim 2, delete "select" and insert --selected-- therefor In Column 10, Line 54, in Claim 2, delete "given" and insert -- -corresponding-- therefor In Column 10, Line 54, in Claim 2, after "the", delete "given"

In Column 10, Line 61, in Claim 4, delete "select" and insert --selected-- therefor In Column 10, Line 64, in Claim 5, after "the", delete "given"

In Column 11, Line 1, in Claim 6, after "the", delete "given"

In Column 11, Line 6, in Claim 7, after "the", delete "given"

In Column 11, Line 8, in Claim 7, delete "select" and insert --selected-- therefor In Column 11, Line 12, in Claim 8, delete "select" and insert --selected-- therefor In Column 11, Line 14, in Claim 8, delete "given" and insert -- -corresponding-- therefor In Column 11, Line 14, in Claim 8, after "the", delete "given"

In Column 11, Line 22, in Claim 10, after "the", delete "given"

In Column 11, Line 22, in Claim 10, delete "select" and insert --selected-- therefor In Column 11, Line 26, in Claim 11, after "the", delete "given"

In Column 11, Line 26, in Claim 11, delete "select" and insert --selected-- therefor